(12) United States Patent
Rydnell et al.

(10) Patent No.: US 8,995,391 B2
(45) Date of Patent: Mar. 31, 2015

(54) METHOD FOR REDUCING THE CONTROL SIGNALING IN HANDOVER SITUATIONS

(75) Inventors: Gunnar Rydnell, Vastra Frolunda (SE); Hans Ronneke, Kungsbacka (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1061 days.

(21) Appl. No.: 12/668,927

(22) PCT Filed: Jul. 13, 2007

(86) PCT No.: PCT/SE2007/000686
§ 371 (c)(1),
(2), (4) Date: Jan. 13, 2010

(87) PCT Pub. No.: WO2009/011621
PCT Pub. Date: Jan. 22, 2009

(65) Prior Publication Data
US 2010/0202375 A1      Aug. 12, 2010

(51) Int. Cl.
| | |
|---|---|
| H04W 4/00 | (2009.01) |
| H04W 68/00 | (2009.01) |
| H04L 12/18 | (2006.01) |
| H04W 8/02 | (2009.01) |
| H04W 36/02 | (2009.01) |
| H04W 36/08 | (2009.01) |
| H04W 80/04 | (2009.01) |

(52) U.S. Cl.
CPC ............... *H04L 12/189* (2013.01); *H04W 8/02* (2013.01); *H04W 36/026* (2013.01); *H04W 36/08* (2013.01); *H04W 80/04* (2013.01)

USPC .......................................... 370/331; 455/458

(58) Field of Classification Search
USPC ........... 370/331–334, 312, 432; 455/436–444
See application file for complete search history.

(56) References Cited

U.S. PATENT DOCUMENTS

| | | | |
|---|---|---|---|
| 2001/0036834 A1 | 11/2001 | Das et al. | |
| 2004/0122890 A1 * | 6/2004 | Watkinson | .................. 709/203 |
| 2006/0159050 A1 | 7/2006 | Kim et al. | |
| 2007/0116051 A1 * | 5/2007 | Chen | ............................. 370/469 |

FOREIGN PATENT DOCUMENTS

WO     2007067000 A1    6/2007

OTHER PUBLICATIONS

Japanese Office Action dated Oct. 25, 2011 from JP2010-516948 (with partial translation), 6 pages.
Russian Office Action dated Aug. 2, 2011 from RU2010105060, 2 pages.

(Continued)

*Primary Examiner* — Afshawn Towfighi
(74) *Attorney, Agent, or Firm* — Rothwell, Figg, Ernst & Manbeck, P.C.

(57) ABSTRACT

The present invention relates to a method, devices, and a program for using IP multicast addresses for mobile terminals (6) (UE) connected to a communication gateway (1) in a wireless communication network (2). The IP multicast address is used for updating routers (3) in the infrastructure network of where to transport data to the UE when the UE connects to another communication gateway (V), this may be updated from the new communication gateway or from a mobility management entity (5) relieving a network gateway (4) (e.g. a SAE gateway) of control traffic reducing the risk of bottle necks in the infrastructure network (2).

16 Claims, 6 Drawing Sheets

(56) References Cited

OTHER PUBLICATIONS

3GPP TS 36.300 V8.0.0 (Mar. 2007), Technical Specification, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8); retrieved from http://www.3gpp.org/ftp/Specs/html-info/36300.htm section 10.

3GPP TR 23.882 V1.2.3 (Jun. 2006), Technical Report, 3rd Generation Partnership Project; Technical Specification Group Services and System Aspects; 3GPP System Architecture Evolution: Report on Technical Options and Conclusions (Release 7), retrieved from: http://www.3gpp.org/ftp/Specs/html-info/23882.htm section 7.

Bajzik, L., et al., "Impact of Intra-LTE Handover with Forwarding on the User Connections", Mobile and Wireless Communications Summit, 2007, 16th IST, Jul. 1-5, 2007, pp. 1-5.

* cited by examiner

METHOD FOR REDUCING THE CONTROL SIGNALING IN HANDOVER SITUATIONS

CROSS-REFERENCE TO RELATED APPLICATION

This application is a 35 U.S.C. §371 National Phase Application from PCT/SE2007/000686, filed Jul. 13, 2007, and designating the United States.

TECHNICAL FIELD

The present invention relates to a solution for mobility management in a telecommunications network and in particular to a solution for reducing control signaling in the network in relation to handover situations. The present invention concerns the area of mobility management and handling of user data for mobiles in active mode in a mobile network.

BACKGROUND OF THE INVENTION

Mobility management in a system such as LTE (E-UTRAN) comprises IDLE mode management and ACTIVE mode management of users. In Idle mode the mobile is moving around in the mobile network without sending or receiving data, its position is known by the network to an approximate degree, e.g. it may be known in which tracking/routing area the mobile is located, but not it's exact cell.

In active mode the UE is moving around and at the same time sending and receiving data (continuously or intermittently). The location of the UE needs to be known by the network (NW) down to the very cell and base station. For a system, in particular a system with small cells such as LTE (Long Term Evolution), for user equipments (UE) in active mode there may be a problem in that there will be very much signaling in the NW in order to update the NW with the current location of the UE. In a hierarchical NW system, e.g. GPRS or Mobitex, there will be signaling up the NW distribution tree to update routing information only in the downmost node common to the new and the old cell. Therefore the NW signaling will be limited. SAE/LTE on the other hand, is specified as a flat IP architecture system and the first common node is at the same time the top node. Tunnel switching and related signaling will be very frequent in the top Core NW nodes.

Therefore, there is a need to specify a solution that makes more efficient mobility signaling for UEs in active mode for flat architecture systems such as SAE/LTE.

SUMMARY OF THE INVENTION

The object of the present invention is to provide more efficient mobility management for active mobiles.

This is provided for in a number of aspects of the present invention, in which a first is provided: a method of mobility management in an Internet Protocol, i.e. IP, enabled wireless communication network, comprising the steps of:
 using IP multicast for data transport of a unicast session for a user equipment, i.e. UE, going into active mode connected to a communication gateway;
 allocating an IP multicast address in a network gateway between an external IP network and the communication network, i.e. SAE GW;
 informing a mobility management entity, i.e. MME, about the IP multicast address;
 informing the communication gateway between the UE and the infrastructure network of the IP multicast address;
 sending a control message from the communication gateway to routers in the infrastructure network to make these aware of that the communication gateway is to receive multicast data for the allocated IP multicast address;
 using in the network gateway the IP multicast address for sending user plane data downlink to the UE;
 using the IP enabled routers in the infrastructure network to transport the user plane data to the communication gateway.

The method may further comprise the step of allowing at least one more communication gateway to receive data for the same IP multicast address. The method may further comprise the steps of:
 receiving a signal from the UE in the MME that the UE has changed connection to a second communication gateway;
 informing from the MME the new communication gateway of the IP multicast address.

The method may further comprise the steps of:
 receiving in a second communication gateway an IP multicast address from the UE;
 sending from the second communication gateway a control message to routers in the infrastructure network to make these aware of that the communication gateway is to receive multicast data for the allocated IP multicast address.

The method may further comprise the steps of:
 obtaining information about at least one communication gateway adjacent of the communication gateway of which the UE is currently connected to;
 including the adjacent communication gateway in receiving data for the allocated multicast address.

The method may further comprise the steps of:
 using both an IP multicast address and a source IP address of the network gateway for identifying a session and what multicast data to receive.

Another aspect of the present invention, an infrastructure gateway device in an Internet Protocol enabled wireless communication network is provided, comprising:
 a processing unit for operating instruction sets;
 a memory for storing instruction sets and data;
 an uplink communication interface;
 a downlink communication interface;
 wherein the processing unit is arranged to use IP multicast for data transport of a unicast session for a user equipment, i.e. UE, going into active mode connected to a communication gateway;
 allocate an IP multicast address;
 inform a mobility management entity, i.e. MME, about the IP multicast address;
 inform the communication gateway between the UE and the infrastructure network of the IP multicast address;
 use the IP multicast address for sending user plane data downlink to the UE.

Yet another aspect of the present invention, a mobile terminal in an Internet Protocol enabled wireless communication network is provided, comprising:
 a processing unit;
 a memory;
 a communication interface arranged to communicate with a communication gateway;
 wherein the mobile terminal is arranged to acquire an Internet Protocol multicast address and to communicate this address to a communication gateway when changing connection from a first communication gateway to a second communication gateway.

Still another aspect of the present invention, an Internet Protocol enabled wireless communication network is provided, comprising:
at least one network gateway;
at least one mobility management entity;
at least one communication gateway between a mobile terminal and the communication network;
wherein the network is arranged to operate the method according to claim 1.

A computer program used in a communication network infrastructure device is provided in the present invention, comprising instruction sets for:
using IP multicast for data transport of a unicast session for a user equipment, i.e. UE, going into active mode connected to a communication gateway;
allocating an IP multicast address;
informing a mobility management entity, i.e. MME, about the IP multicast address;
informing the communication gateway between the UE and the infrastructure network of the IP multicast address;
using in the network gateway the IP multicast address for sending user plane data downlink to the UE;

Further, another aspect of the present invention, an infrastructure mobility management device in an Internet Protocol enabled wireless communication network is provided, comprising:
a processing unit for operating instruction sets;
a memory for storing instruction sets and data;
a communication interface;
wherein the processing unit is arranged to obtain information about an Internet Protocol multicast address used for a mobile terminal connected to a communication gateway;
inform the communication gateway between the UE and the infrastructure network of the IP multicast address.

The solution in the present invention is generally applicable to mobility management for 3GPP and also for non-3GPP systems. The benefits are mostly visible for a system with a flat IP architecture. It is applied here to SAE/LTE as being a Flat IP Architecture; however, it may be applicable to other flat IP architectures.

Further benefits are a unified treatment of unicast, bicast, and multicast (MBMS) traffic.

The present invention also provides for a bicasting mode allowing soft handover.

The invention provides for the advantage of relieving network gateways, as for instance the SAE GW, of control traffic reducing the risk of getting bottle necks in the infrastructure network.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION OF PREFERRED EMBODIMENTS

Figure 1:
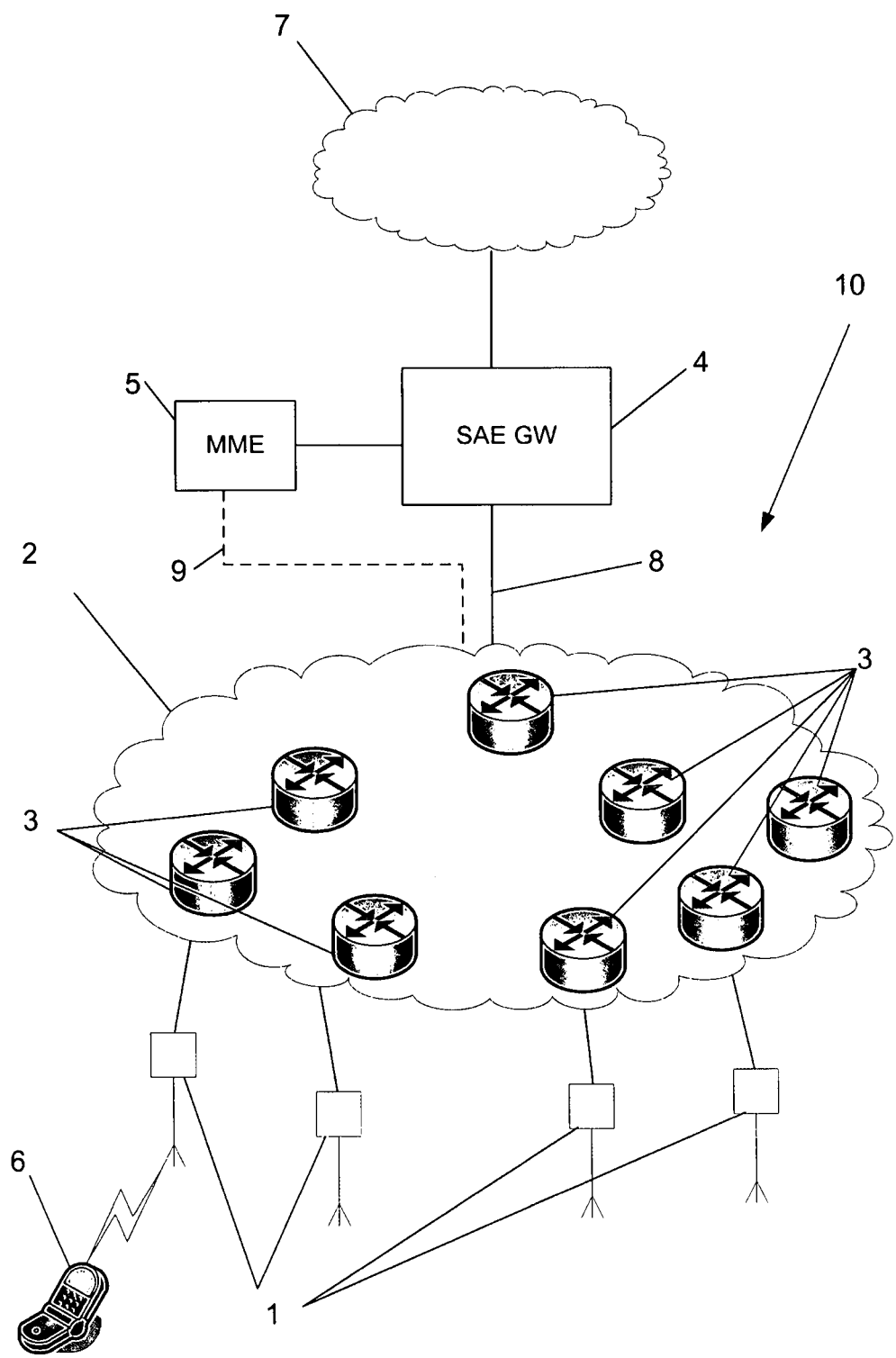
FIG. 1 illustrates schematically a network according to the present invention.

In FIG. 1 reference numeral 10 generally indicate a network according to the present invention. The network comprises at least one eNodeB, 1, or any other suitable interconnecting device for connecting a wireless terminal 6 with an infrastructure network, an infrastructure backbone IP network 2 with at least one router or switch 3. An SAE (System Architecture Evolution) gateway 4 (GW) is connected to the backbone IP network 2 through an S1 U interface. A mobility management entity 5 (MME) is communicatively connected to the SAE GW 4 but also communicatively connected to backbone IP network 2 through an S1 MME interface 9. An IP network is connected to the SAE GW. The eNodeBs 1 are arranged to communicate wirelessly using any suitable communication protocol with mobile terminals 6 (UE, User Equipment), such as mobile phones, laptops, PDA (personal digital assistant) smart phones, and other equipment with a wireless communication interface suitable for the current communication protocol used by the interconnecting device 1.

Figure 2:
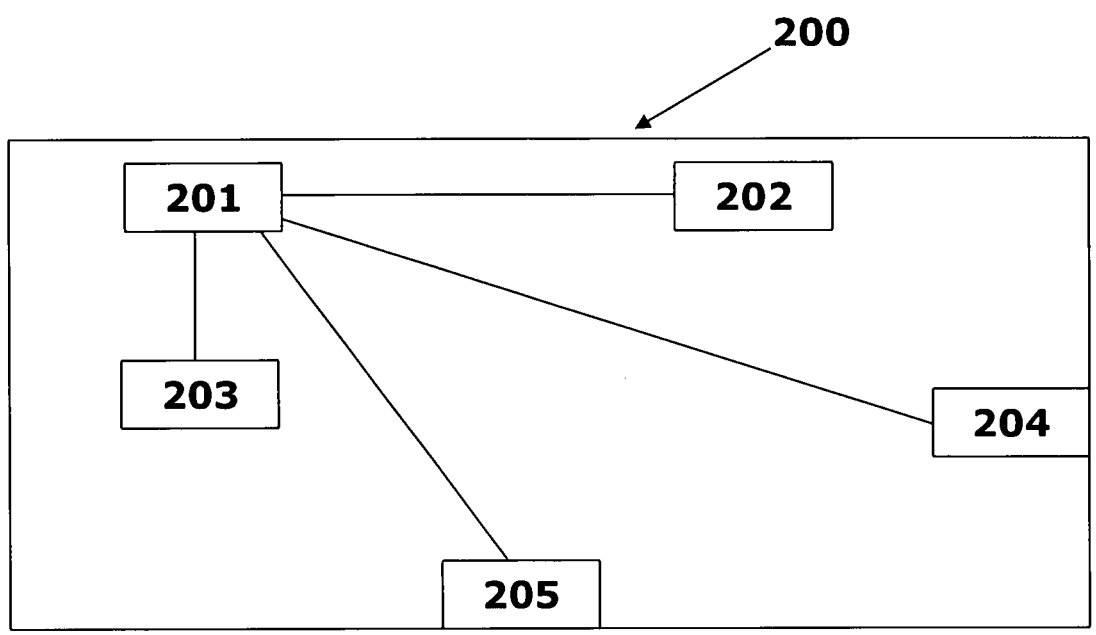
FIG. 2 illustrates schematically an infrastructure device according to the present invention.

The invention may be realized as software in one or several infrastructure devices 200 (as illustrated in FIG. 2) comprising a processing unit 201, at least one memory 202, and an interface 203 to other components for running the device 200. However, these other components are known to the skilled person and not included in this description. Furthermore, the device 200 may have at least one downlink 204 communication interface and uplink 205 communication interface (it should be noted that these may be incorporated into the same physical communication interface, such as an Ethernet connection or similar). The memory may comprise volatile and/or non-volatile memory types, including but not limited to RAM, DRAM, ROM, EEPROM, hard disk, Flash, or similar. The processing unit 201 may comprise any suitable computational device for operating program instruction sets, including but not limited to a microprocessor, FPGA (field programmable gate array), ASIC (Application Specific Integrated Circuit), digital signal processor, and so on.

Figure 3:
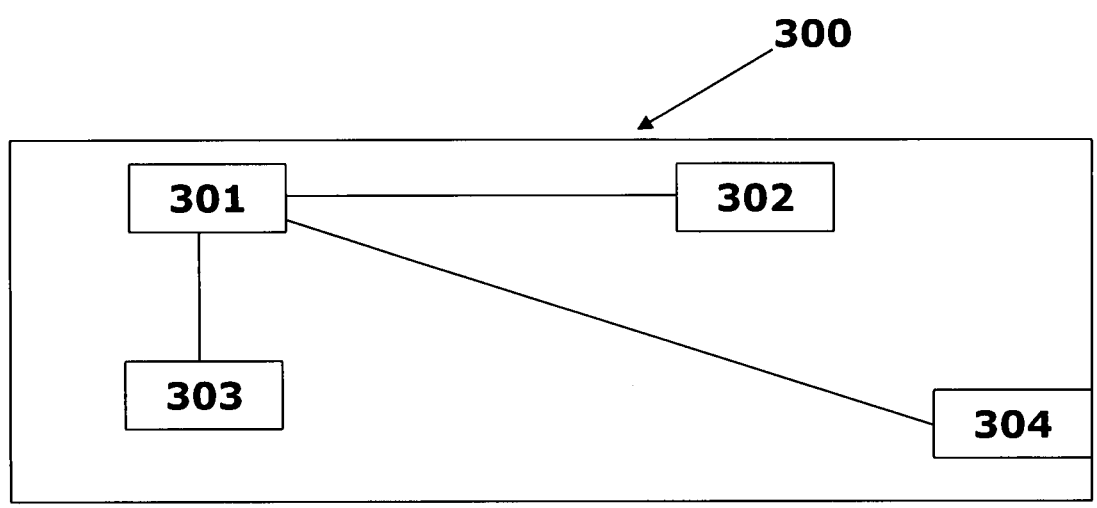
FIG. 3 illustrates schematically a mobile terminal according to the present invention.

Similarly, FIG. 3 shows a mobile terminal 6, 300 according to the present invention, which operates similarly to the infrastructure device 200 with a processing unit 301, a memory 302, an interface 303 to other components of the terminal 6, 300, and a communication interface 304 for wireless communication with the infrastructure network 2 (and further) via an eNodeB 1 for instance. The memory and processor may be of similar types as mentioned in relation to the infrastructure device 200.

The communication interfaces 304 and 204 between the terminal 300 and the infrastructure device 200 is arranged to be a wireless interface (directly or indirectly using further infrastructure devices (not shown)) of any suitable type, for instance 2.5 G, 3 G and beyond.

In idle mode the UE 6 moves around and its position is known by the MME 5 by the Tracking/Routing Area. In Active mode the UE is receiving and sending data to an end-point on an external PDN (Packet Data Network), e.g. the Internet. The SAE GW 4 is the GW to external PDN 7 and a User Plane path is established between the PDN and the UE via the SAE GW and the current eNodeB 1. When the UE moves to a new cell, the path must be switched in the SAE GW to be able to send DL (Down Link) data to the UE connected to the new eNodeB. Traditionally (e.g. in GPRS) this is done in Session Management through maintaining a PDP (Packet Data Protocol) context and a GTP (GPRS Tunnel Protocol) tunnel through the NW (Network). However, there is a problem in this solution; when the cells are small and the architecture is flat there will be extensive signaling to the SAE GW in order to update all tunnels for each UE to the correct eNodeB.

In the present solution IP Multicast is used as a transport mechanism between the SAE GW 4 and the eNodeB 1 for User Plane transport for UEs 6 in Active mode, i.e. that IP Multicast is used as a transport protocol for Unicast data. User packets in unicast mode will be encapsulated and transported in the backbone using IP Multicast transport. GTP User Plane protocol will not be used. The procedure will be that when the UE goes into Active mode, it will signal to the SAE GW 4 or the MME 5 to activate the UP (User Plane). The MME or the SAE GW will allocate an IP Multicast address; alternatively an IP Multicast address is requested from and received from the selected SAE GW. With the use of SSM (Source Specific Multicast), also the SAE GW Source Address will be provided in bearer establishment signalling and used by eNodeB in IGMP Join. With the use of the SSM extension of IP Multicast (RFC 4607) it will be possible to get a faster establishment of the IP Multicast path between the SAE GW and the eNodeB, which is important at mobility when moving between cells. The activation message including the IP MC address is sent to the SAE GW (or known by the SAE GW if it is the entity providing the IP multicast address) and to the eNodeB (alternatively to the UE). The SAE GW will send the UE DL data to the assigned IP MC address. The eNode B shall receive the data sent to the IP MC address, and therefore sends an IGMP Join (or similar control message to make the network aware of the desire to belong to specific multicast group, e.g. a membership report message as used in IGMPv3) to the backbone NW. The Backbone IP NW 2 is Multicast enabled in that Routers 3 are compatible with IP Multicasting. The Routers will receive the IGMP Join and forward the message such that all packets sent to the specific IP MC address to the backbone will be delivered to the eNode B that Joined. The SAE GW will send the DL UP data to the IP MC address without actually knowing the location of the UE and in which eNode B the UP ends up.

When the UE moves to a new eNode B, the UE signals to the NW, e.g. to the MME, indicating the new location (eNodeB) and the MME sends the IP MC address of the User Plane of the UE Session, to the new eNode B, which now joins the IP MC session by sending IGMP Join to the backbone. The backbone builds up the new transmission path so that the traffic is now sent to the new eNode B and the UE can receive the session data. Note that there is no signalling to the SAE GW which is not aware of the location of the UE, but just needs to send the UP traffic out on the IP MC enabled backbone. An alternative method would be that the UE is informed by the MME about the IP MC address at activation. In this case, when the UE moves to a new eNodeB, the UE can initiate that the new eNodeB does IGMP Join. The UE informs the new eNode B about the IP MC address and the new eNode B does IGMP Join to the Backbone. The MME may or may not be informed about the cell change.

A further possibility with the proposed method would be to facilitate efficient HO (Hand Over) by informing cells surrounding the cell where the UE is currently located to also join the IP MC transport. Then, if the UE moves into an adjacent cell the new eNode B already has the DL traffic stream and it can be delivered to the UE without interruption. This will be discussed in some more detail in relation to FIG. 6 later in this document.

Note that with the Source Specific Multicast (SSM) extension (IETF RFC 4607, 4604, 4608) to IP Multicast, the Source address is used for IP MC routing. In this, case the routing and the building up of routing tables is more efficient. Also the Source address will always be available in the destination i.e. in the eNode B, and the eNode B will also use the Source address for sending UL (Up Link) traffic for the Session in question, so that the UL will go to the correct SAE GW, which will act as an Anchor point for UL and DL traffic.

The mobility outlined here is quite general and could also be use for non-3GPP mobility as well as generally in any NW that is IP Multicast enabled according to the SSM IP MC RFC's.

For the SAE GW handling of unicast DL traffic and MBMS multicast DL traffic will be the same and will mainly differ in the source for the traffic (BM-SC for MBMS traffic over SGmb & SGi and external/internal PDN over SGi for unicast traffic). GTP is not used, and that the IP MC address is used instead of GTP TEIDs.

Figure 4:
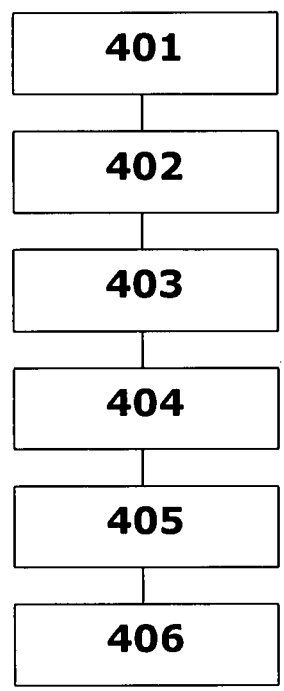
FIG. 4 illustrates schematically a method during session activation according to the present invention.

An example method for Session Activation referring to FIG. 4 will now be given:

401. The UE is attached to the network (registered in the MME, and authenticated, etc.). The UE wants to Activate a Data Session (equivalent to doing an Activate PDP Context in GPRS), and sends an activation message to the MME.

402. The MME allocates a bearer, with the correct bearer characteristics such as QoS, mode etc. (using some method which is not interesting in the context discussed here). The MME selects the SAE GW (e.g. using the APN) and also assigns a transport bearer between the SAE GW and the eNode B (equivalent to a GTP tunnel used in GPRS), i.e. the MME assigns an IP Multicast address, which the SAE GW shall use for sending UP data DL to the eNode B for this UP transport channel. The assignment of an IP Multicast address may alternatively be done in the SAE GW as part of the procedure or upon request from MME.

403. The MME sends the bearer parameters, including the IP MC address, to the SAE GW. The SAE GW creates a context for the Session for the UE.

404. The MME sends the bearer parameters, including the IP MC address, to the eNodeB. The eNodeB creates a context for the Session for the UE.

405. The eNode B sends IGMP Join to the IP MC enabled Backbone NW, which creates the transport path between the SAE GW and the eNode B.

406. The UE can start sending and receiving data on the UP path via the eNode B and the SAE GW, to and from the external PDN e.g. Internet. The SAE GW need not care about the location of the UE but will only send the DL data out to the IP MC backbone, which will take care of delivering the data to the correct eNode B.

Figure 5:
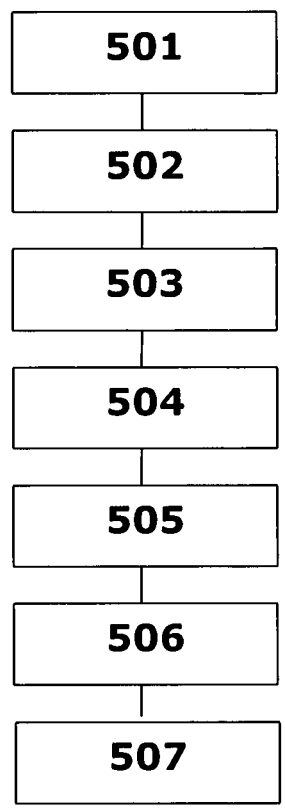
FIG. 5 illustrates schematically a method during hand over according to the present invention.

Now an example method for handling Hand Over to new cell in Active Mode referring to FIG. 5 will be given:

501. The UE is in active mode and has an ongoing user Plane Session and moves into a new cell and is reachable via a new eNode B.

502. The UE signals the cell change to the MME.

503. The MME indicates to the new eNodeB the IP MC address that is used by the SAE GW to transport the DL UP data traffic. Also the Source IP Address is indicated, which the eNode B will use in the IGMP Join if SSM is used and to send UL user plane traffic for the session for this UE.

504. The new eNode B sends IGMP Join to the backbone to join the transport of the session and start receiving the UP traffic for this UE.

505. The IP MC enabled NW builds up the distribution tree for the DL data path for this session (i.e. for the IP MC address).

506. The new eNode B starts receiving the DL data which is sent to the UE.

507. The old eNode B is notified (or the session times out) and the old eNode B sends IGMP Leave, in order to stop delivery of the payload to the old eNodeB.

Note that there is no signalling to the SAE GW in the HO procedure. The SAE GW does not know the location of the UE, but will only send the DL data out to the IP MC backbone, which will route the packets to the correct eNode B.

Note that if the alternative method where the bearer transport information (i.e. the IP MC transport address) is sent to the UE the chart above is simplified, such that the MME is not involved, but the new eNode B is directly informed about the IP MC address by the UE.

Figure 6:
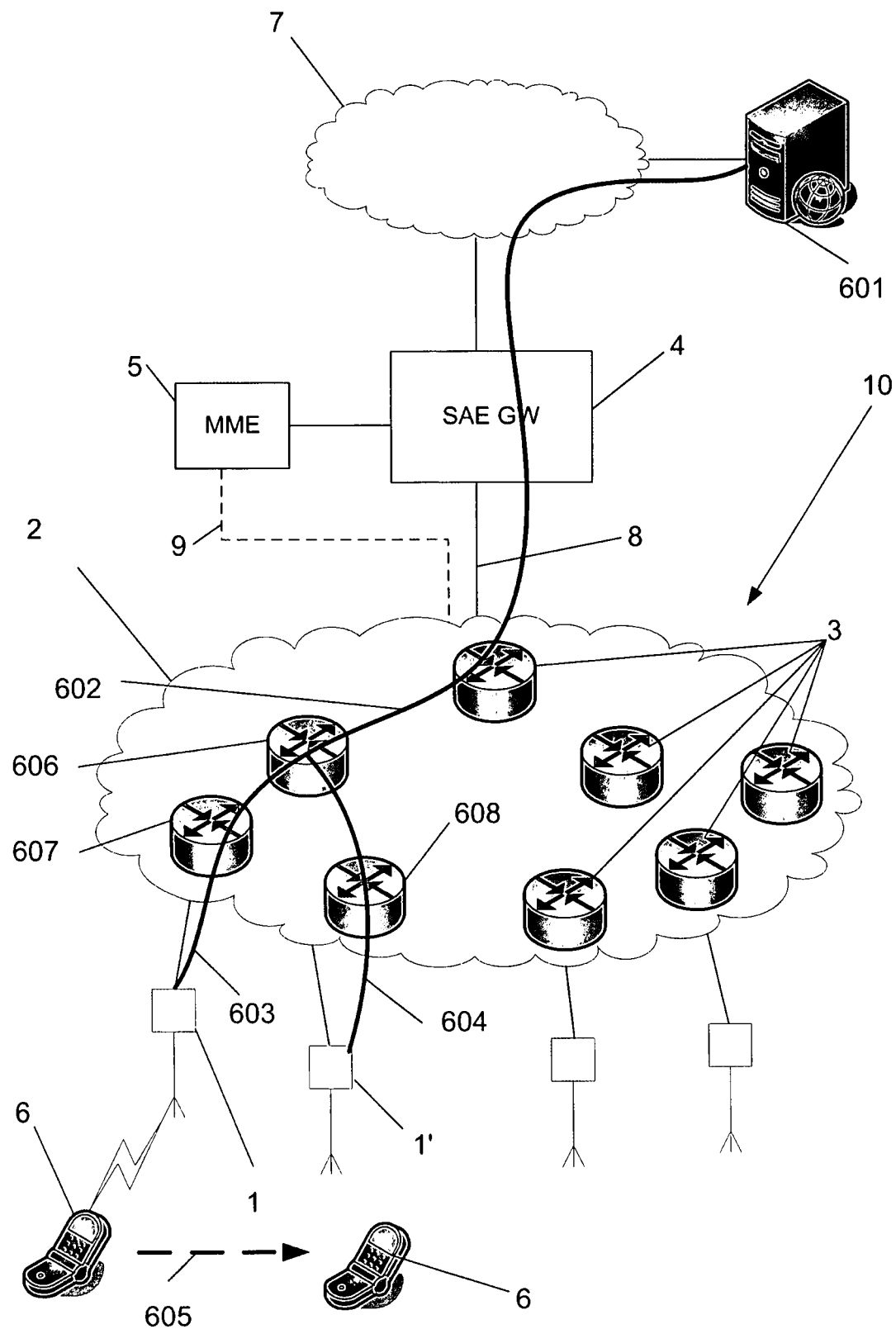
FIG. 6 illustrates a network according to the present invention in a hand over situation.

FIG. 6 illustrates the hand over case in a network according to the present invention, where data from an application server 601 is to be transported downlink to the UE 6. However, during this process the UE 6 moves to a new location and thus connects to another eNodeB 1'. The data then need to be redirected to the new eNodeB 1'. Data is transported to the SAE GW 4 and there forwarded to the MC address noted for the UE 1. In this case it will be forwarded towards 602 the last known eNodeB 1 passing routers 606 and 607 with final connection 603 to the eNode B 1. However, router 606 has been informed that data to the MC address shall now be forwarded towards the new eNodeB 1' (too), where the UE is now connected instead. When the UE moved the new eNode B 1' informed (using suitable MC control messaging) upstream routers 608 and 606 of the new situation and thus router 606 can forward the data the new path 604 too. When the UE has left the old eNode B and completely disconnected from it, the old eNode B informs (using suitable MC control messaging) upstream routers 607 and 606 of the new situation and thus router 606 may stop forwarding the data on the 603 path.

In one embodiment of the present invention, an upstream router 606 at suitable level may be informed that there is certain likelihood that the UE 1 will change eNode B in the near time future and also be informed about which eNode B(s) that are likely to be connected to the UE. In this case it is possible to send data to two (or more) directions at the same time, a so called bicast solution: a direction where the UE is located currently, and a direction towards an eNode B 1' where it is likely the UE will connect to in the near future. In this way the movement of the UE 6 is anticipated and the risk of loosing data is reduced. The same bicast solution may be used when it is actually known that the UE is in progress of transferring from one eNode B 1 to another eNode B 1' in order to provide an effective soft handover using the multicast solution of the present invention.

IP Multicast addresses in general may be allocated for the 224.0.0.0 to 239.255.255.255 and the sub-range allocated for source specific multicast use is 232.0.0.0 to 232.255.255.255 (232/8). Corresponding for IPv6 is FF3x::/32. Some addresses in the range may be reserved, but up to 16 million addresses may be available for each source address when source specific multicasting is used according to RFC 4607, 4604, and 4608. The SSM specific IP multicast address range can be reused for each SAE GW. This means the solution is scalable and any number of sessions can be supported just by adding additional SAE GWs, where each SAE GW has its own unique IP address (i.e. SSM source address).

Some of the advantages of this invention are efficient signalling and simplified mobility management in a flat architecture mobile NW which is IP Multicast enabled.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may at least in part be implemented by means of both hardware and software, and that several "means" may be represented by the same item of hardware.

The above mentioned and described embodiments are only given as examples and should not be limiting to the present invention. Other solutions, uses, objectives, and functions within the scope of the invention as claimed in the below described patent claims should be apparent for the person skilled in the art.

DEFINITIONS AND ABBREVIATIONS

BS Base Station
DL Downlink
eNodeB E-UTRAN Node B
E-UTRAN Evolved UMTS Terrestrial Radio Access Network
GPRS General Packet Radio Services
GTP GPRS Tunneling Protocol
GW Gateway
IP Internet Protocol
LTE Long Term Evolution
MAC Medium Access Control
MBMS Multimedia Broadcast Multicast Service
MC Multicast
MCCH Multicast Control Channel
MCH Multicast Channel
MME Mobility Management Entity
MS Mobile Station
NodeB UTRAN base station
PDN Packet Data Networks
PDU Protocol Data Unit
RNC Radio Network Controller
SAE System Architecture Evolution
SSM Source Specific Multicast
TEID Tunnel Endpoint IDentifier
UE User Equipment
UL Uplink
UL-SCH Uplink Shared Channel
UMTS Universal Mobile Telecommunications System
UP User Plane
UPE User Plane Entity
U-plane User plane
UTRA UMTS Terrestrial Radio Access
UTRAN UMTS Terrestrial Radio Access Network
VoIP Voice over IP
WCDMA Wideband Code Division Multiple Access
WLAN Wireless Local Area Network

The invention claimed is:

1. A method of mobility management in an Internet Protocol (IP) enabled wireless communication network, comprising the steps of:
using IP multicast for data transport of a unicast session for a user equipment (UE) going into active mode connected to a communication gateway that is located between the UE and an infrastructure network;

allocating an IP multicasting address for use in transporting data to the UE, wherein the IP multicasting address is an IP multicast address and not an IP unicast address;

informing the communication gateway of the allocated IP multicast address;

sending a control message from the communication gateway, which is located between the UE and the infrastructure network, to a router in the infrastructure network to configure the router to forward to the communication gateway IP packets addressed to the allocated IP multicast address;

using in a network gateway the IP multicast address for sending user plane data downlink to the UE; and using the router in the infrastructure network to transport the user plane data to the communication gateway.

2. The method according to claim 1, further comprising the step of allowing at least one more communication gateway to receive data for the same IP multicast address.

3. The method according to claim 2, further comprising the steps of:

receiving a signal from the UE in the MME that the UE has changed connection to a second communication gateway;

informing from the MME the new communication gateway of the IP multicast address.

4. The method according to claim 2, further comprising the steps of:

receiving in a second communication gateway an IP multicast address from the UE;

sending from the second communication gateway a control message to routers in the infrastructure network to make these aware of that the communication gateway is to receive multicast data for the allocated IP multicast address.

5. The method according to claim 2, further comprising the steps of:

obtaining information about at least one communication gateway adjacent of the communication gateway of which the UE is currently connected to;

including the adjacent communication gateway in receiving data for the allocated multicast address.

6. The method according to claim 2, further comprising the steps of: using both an IP multicast address and a source IP address of the network gateway for identifying a session and what multicast data to receive.

7. The method according to claim 1, wherein the Internet Protocol enabled wireless communication network, comprises: at least one network gateway; at least one mobility management entity; and at least one communication gateway between a mobile terminal and the communication network.

8. The method according to claim 1, further comprising receiving information indicating that the UE has transmitted an activation message to activate a user plane (UP) data session, wherein the step of allocating the IP multicast address is performed in response to receiving said information.

9. The method of claim 1, wherein the IP multicast address is an IP Version 4 (IPv4) address within the range 224.0.0.0 through 239.255.255.255.

10. The method of claim 1, wherein the IP multicast address is an IP Version 6 (IPv6) address, wherein the high-order octet of the IPv6 address is a value of 0xFF.

11. An infrastructure gateway device in an Internet Protocol (IP) enabled wireless communication network, comprising:

a processing unit for operating instruction sets;
a memory for storing instruction sets and data;
an uplink communication interface;
a downlink communication interface; wherein
the processing unit is arranged to: (i) use IP multicasting for data transport of a unicast session for a user equipment (UE) going into active mode connected to a communication gateway; (ii) allocate an IP multicasting address, wherein the allocated IP multicasting address is an IP multicast address and not a unicast address; (iii) inform a mobility management entity (MME) about the IP multicast address; (iv) inform the communication gateway between the UE and the infrastructure network of the IP multicast address; (v) use the IP multicast address for sending user plane data downlink to the UE.

12. The infrastructure gateway device of claim 11, wherein the IP multicast address is an IP Version 4 (IPv4) address within the range 224.0.0.0 through 239.255.255.255.

13. The infrastructure gateway device of claim 11, wherein the IP multicast address is an IP Version 6 (IPv6) address, and the high-order octet of the IPv6 address is a value of 0xFF.

14. A computer program product comprising a non-transitory computer readable medium storing a computer program used in a communication network infrastructure device, the computer program comprising:

instructions for using IP multicast for data transport of a unicast session for a user equipment (UE) going into active mode connected to a communication gateway;

instructions for allocating an IP multicast address, wherein the allocated IP multicast address is not a unicast address;

instructions for informing a mobility management entity (MME) about the IP multicast address;

instructions for informing the communication gateway between the UE and the infrastructure network of the IP multicast address;

instructions for using in the network gateway the IP multicast address for sending user plane data downlink to the UE.

15. The computer program product of claim 14, wherein the IP multicast address is an IP Version 4 (IPv4) address within the range 224.0.0.0 through 239.255.255.255.

16. The computer program product of claim 14, wherein the IP multicast address is an IP Version 6 (IPv6) address, and the high-order octet of the IPv6 address is a value of 0xFF.

* * * * *

UNITED STATES PATENT AND TRADEMARK OFFICE
CERTIFICATE OF CORRECTION

PATENT NO. : 8,995,391 B2  
APPLICATION NO. : 12/668927  
DATED : March 31, 2015  
INVENTOR(S) : Rydnell et al.

Page 1 of 1

It is certified that error appears in the above-identified patent and that said Letters Patent is hereby corrected as shown below:

On the title page,

Item 75, under "Inventors", in Column 1, Line 1, delete "Vastra Frolunda" and insert -- Västra Frölunda --, therefor.

Item 75, under "Inventors", in Column 1, Line 2, delete "Hans Ronneke," and insert -- Hans Rönneke, --, therefor.

In the claims,

In Column 9, Line 47, in Claim 7, delete "network," and insert -- network --, therefor.

Signed and Sealed this  
Twenty-first Day of June, 2016

Michelle K. Lee  
*Director of the United States Patent and Trademark Office*